United States Patent [19]

Gundersen

[11] Patent Number: 5,787,147
[45] Date of Patent: Jul. 28, 1998

[54] TEST MESSAGE GENERATOR IN A TELECOMMUNICATIONS NETWORK

[75] Inventor: Hans Gundersen, Richardson, Tex.

[73] Assignee: Ericsson Inc., Research Triangle Park, N.C.

[21] Appl. No.: 576,509

[22] Filed: Dec. 21, 1995

[51] Int. Cl.[6] .......................... H04M 1/24; H04M 3/08; H04M 3/22
[52] U.S. Cl. .................. 379/10; 379/1; 379/15; 379/23; 379/31
[58] Field of Search .................. 379/9–10, 13–15, 379/34, 230, 5, 201, 207, 1; 370/248, 400, 402

[56] References Cited

U.S. PATENT DOCUMENTS

| | | |
|---|---|---|
| 4,998,240 | 3/1991 | Williams ........................ 370/17 |
| 5,027,343 | 6/1991 | Chan et al. .................... 370/17 |
| 5,189,663 | 2/1993 | Williams ........................ 370/17 |
| 5,375,159 | 12/1994 | Williams ........................ 379/23 |
| 5,418,793 | 5/1995 | Chang et al. .................. 371/27 |
| 5,574,782 | 11/1996 | Baird et al. ................... 379/207 |
| 5,579,371 | 11/1996 | Aridas et al. .................. 379/34 |

FOREIGN PATENT DOCUMENTS

| | | |
|---|---|---|
| 0 480 527 A2 | 4/1992 | European Pat. Off. . |
| 0 480 826 A1 | 4/1992 | European Pat. Off. . |
| 0 534 241 A2 | 3/1993 | European Pat. Off. . |
| 0 551 648 A2 | 7/1993 | European Pat. Off. . |
| 0 579 302 A1 | 1/1994 | European Pat. Off. . |
| 0 584 848 A1 | 3/1994 | European Pat. Off. . |

*Primary Examiner*—Curtis A. Kuntz
*Assistant Examiner*—Binh K. Tieu
*Attorney, Agent, or Firm*—Jenkens & Gilchrist

[57] ABSTRACT

A test message is constructed using a set of predefined natural language message types and keywords. The constructed test message is then interpreted during run-time and converted to a properly formatted Transaction Capable Application Part (TCAP) message. The converted TCAP message is transmitted to a telecommunications software module being tested. When a response to the transmitted TCAP message from the software module is received by the interpreter, it is compared against yet another test message constructed using a set of predefined natural language message types and keywords to verify the proper execution of the software module. If a difference exists, an error message is generated by the interpreter and recorded in a log file.

28 Claims, 7 Drawing Sheets

TEST MESSAGE GENERATOR IN A TELECOMMUNICATIONS NETWORK

CROSS REFERENCE TO RELATED APPLICATION

This application is related to U.S. application for patent Ser. No. 08/577,913, filed Dec. 21, 1995, entitled "Testing Tools in an Intelligent Network System", filed concurrently herewith.

BACKGROUND OF THE INVENTION

1. Technical Field of the Invention

The present invention relates to a testing environment in a telecommunications system and, in particular, to the generation of Transaction Capabilities Application Part (TCAP) messages for testing of Service Control Point (SCP) and Service Data Point (SDP) software modules within an intelligent network (IN).

2. Description of Related Art

With the developments and improvements in sophisticated telecommunications applications, the telecommunications industry has adopted the term "Intelligent Network (IN)" to denote a concept and architecture for providing vendor-independent and network-independent interfaces between the service logic and the transmission and switching system of a multi-enterprise telecommunications network. The goals of the IN are to centralize the control node handling the service execution within a telecommunication network to provide rapid definition, testing and introduction of new services as well as modifications of existing services. IN also provides greater flexibility in the design and development of new services in a multi-vendor environment with shorter lead time, and standard network interfaces.

Accordingly, the basic concept behind IN is to move the intelligence out of each local exchange or Service Switching Point (SSP) and centralize the services providing the intelligence in a Service Control Point (SCP). By centralizing the special subscriber services in an SCP, a new service can be added in only one place and provided to all subscribers connected to the multiple SSPs which are connected to the SCP. Consequently, a larger number of subscribers connected by way of multiple SSPs are serviced by a single SCP.

Unfortunately, such a distributed-system configuration adds additional burdens on the SCP to create an error-free environment and still guarantee safe, near-instant deployment. In order to guarantee such safe and error-free systems, SCP developers must maintain a separate test lab duplicating the above real-time distributed-system configuration for function test purposes. Before a new software module is installed on a live SCP or SDP (SCP/SDP), it must undergo arduous functional testing procedures at a test lab to ensure that the new module and its functionality will perform correctly.

However, maintaining such a test lab is both expensive and cumbersome. It is expensive because, even though it is only the software modules that need to be tested, the test lab must be physically equipped with all the necessary devices and components (i.e., hardware) to duplicate the real environment. It is cumbersome because setting up the required test lab configurations is always a tedious process, especially if more than one test personnel uses the same lab for different test purposes or configurations. It is also more difficult to debug and perform function tests on a real-time telecommunications environment because of a lack of testing tools and capabilities. Furthermore, where software modules are being developed concurrently with hardware modules and devices, there might not be a test lab available to provide the necessary platform for new software modules to be tested. Since software modules need to be function tested during each development phase of a project, such a concurrent development creates an undesirable delay on the overall project development.

A number of testing devices and simulators have been produced and marketed in order to alleviate the above problems. Such devices or simulators are connected to an exchange via a Signaling System No. 7 (SS7) communication link and generate SS7 signals to test the execution of software modules within a telecommunications exchange.

Furthermore, a patent application filed concurrently herewith and assigned to the same assignee as the present application, incorporated by reference herein, U.S. application for patent Ser. No. 08/577,913, filed Dec. 21, 1995, entitled "Testing Tools in an Intelligent Network System," herein after referred to as the Kite application, discloses a computer simulator that generates and transmits necessary Transaction Capabilities Application Part (TCAP) messages. Such a simulator, as disclosed in the Kite application, replaces an expensive SSP node while generating the necessary TCAP messages to properly perform a function test on new SCP or SDP functionalities. A simulator is connected to a SCP or SDP via a Local Area Network (LAN) utilizing Transmission Control Point/Internet Protocol (TCP/IP) packets as the data carrier. Accordingly, TCAP messages are encapsulated using TCP/IP packets and communicated via a LAN. The Kite application further discloses a system that loads new SCP/SDP software modules onto an ubiquitous work-station and tests the modules within an entirely non-telecommunications environment.

However, one of the problems and inconveniences in testing a node in an SS7 telecommunications network and still remaining in spite of the invention disclosed by the Kite application is to encode and decode the message formats that the TCAP protocol requires. In a test situation, regardless of whether a real SCP/SDP or UNIX based computer platform is used to test new software modules, it is both tedious and time consuming to create and encode TCAP messages. Manual coding and decoding of TCAP messages is a very cumbersome and unreliable process, and a miscoding of even a single bit in a stream of data causes an undesirable execution within the tested system. Accordingly, it would be advantageous to provide a test tool to formulate and transmit TCAP messages using a more user-friendly and user-comprehensible script language.

SUMMARY OF THE INVENTION

Instead of manually encoding and decoding Transaction Capabilities Application Part (TCAP) messages directly into the TCAP format, a natural language interpreter is used. The interpreter uses a natural language script file which contains user friendly and user comprehensible syntax data to produce correctly formatted TCAP messages. A specific test scenario is prepared using the less error prone and user friendly natural language, and the interpreter automatically transforms the test scenario into TCAP messages during run-time. The generated TCAP messages are transmitted over a communication link to the platform supporting new software modules to effectuate internal execution of the software modules for function test purposes. Furthermore, the interpreter waits for return messages from the platform supporting the new SCP or SDP software modules and compares the data values contained in the return messages against the expected values specified by the script file. If there is a mismatch, an error message is generated.

In one aspect, the present invention includes a method and apparatus for generating TCAP messages using a natural script language to test a telecommunications software module.

In another aspect, the present invention includes a method and apparatus for comparing a received TCAP message with a user specified test message written in natural script language to verify whether a telecommunications software module has performed correctly.

In still another aspect, the present invention provides an ignore directive to verify the existence of specified data within a received TCAP message but to ignore the numerical value of that data.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
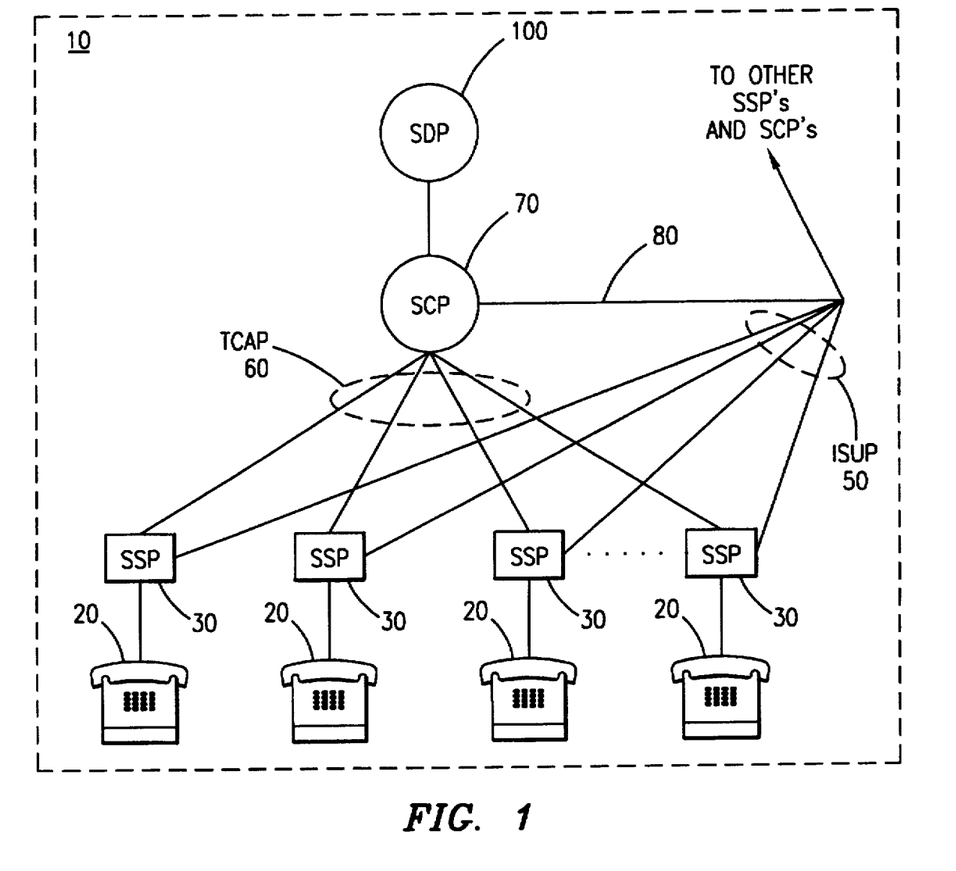
FIG. 1 is a block diagram illustrating a network configuration of an Intelligent Network (IN)

FIG. 1 shows an Intelligent Network (IN) in which the present invention, as will be disclosed herein, may be implemented. In a typical telecommunication network 10, there are virtually limitless local exchanges and other support computers interconnected with each other to provide telecommunications services to telecommunications subscribers. These local exchange switches and computers are manufactured by different vendors and each may have its own protocols and specifications. Each computer, and each application program in the computer, may require a different communication access method and protocol (i.e., a standard convention for communicating intelligently) for a viable "conversation" to proceed. This sets very specific requirements on either or both parties to the conversation that they communicate in a form that they can recognize and manipulate. This may also involve protocol conversion to accommodate an end user's format, code, and language syntax.

In the United States and worldwide, the most widely accepted standard for solving the above problems for telecommunications communication has been Common Channel Signaling (CCS), and the most commonly used technology for implementing the CCS standard has been the Common Channel Signaling System No. 7 (SS7) protocols created by the International Telephone & Telephone Consultative Committee (CCITT). This CCS signaling system, designed using the concepts of packet switching and tailored to conform with the OSI model, has been developed for use with both national and international traffic, for local and long-distance networks, for interexchange signaling, and for various types of channels, including both terrestrial and satellite channels. Furthermore, the introduction of a packet-switched network used to carry call-signaling messages makes other data-handling services possible as well. These services include the Class Automatic Callback (CAC), Class Automatic Recall (CAR), Calling Party Identification features.

Moreover, with the developments of the above mentioned special subscriber features and other sophisticated telecommunications applications, the telecommunications industry has adopted the term "Intelligent Network" (IN) to denote a concept and architecture to provide vendor-independent and network-independent interfaces between the service logic and the transmission and switching systems of a multi-enterprise telecommunications network. The goals of the Intelligent Network (IN) are to centralize the control node handling the service execution within a telecommunication network to provide rapid definition, testing and introduction of new services as well as modification of existing services. IN also provides greater flexibility in the design and development of new services in a multi-vendor environment with shorter lead times, and standard network interfaces.

Accordingly, the basic concept behind IN is to move the intelligence out of each local exchange or Service Switching Point (SSP) 30 and centralize the services providing the intelligence in a Service Control Point (SCP) 70. By centralizing the special subscriber services in the SCP 70, a new service can be added in only one place and provided to all subscribers connected to the multiple SSPs 30. Therefore, one SSP 30 serves multiple telecommunications subscribers or terminals 20, and one SCP 70 serves multiple SSPs or local switches 30. The interfaces between SSPs 30 and the SCP 70 are by links 60 utilizing the SS7 Transaction Capabilities Application Part (TCAP) as the application layer protocol. TCAP messages enable telecommunications nodes to inter-communicate application level data in order to provide special subscriber services.

No voice link is needed because the responsibilities assigned to the SCP and SSP have been clearly delineated and separated from each other: the SSP (local exchange) controls basic telecommunications switching functions; and the SCP contains the advanced intelligence and logic that provide advanced telecommunications services to telecommunications users. Therefore, the SCP 70 receives the state of call information from the SSP 30, ascertains the current call situation from that information, and returns call control commands back to the SSP 30 who in turn routes or controls the actual telecommunications call. In other words, the SCP 70 does not require any switching capabilities and can be developed independently from the SSPs 30 using a more user friendly operating system environment such as UNIX. Such UNIX systems further provide portability and compatibility among different UNIX platforms.

As illustrated in FIG. 1, a single SCP 70 or SDP 100 (SCP/SDP) serves multiple SSPs 30 via TCAP links 60. Consequently, the SCP 70 must be able to maintain an error-free system in order to guarantee telecommunications services to a multitude of subscribers. As a result, whenever a new software module needs to be installed on a live SCP/SDP, the new module must undergo tremendously arduous functional test procedures to verify and guarantee that such a module will perform correctly. In order to perform such function tests, telecommunications vendors usually maintain separate test labs to duplicate the real IN network environment and to be able to function test the new software module under similar circumstances. Unfortunately, maintaining such test labs is very expensive and cumbersome because, even though it is only the software modules that need to be tested, all other interconnected modules and devices have to be installed in order to duplicate the real IN environment. Accordingly, the Kite application filed concurrently herewith discloses a system that substitutes one or more of the nodes in the above IN network with a less expensive and more user-friendly computer system.

Figure 2:
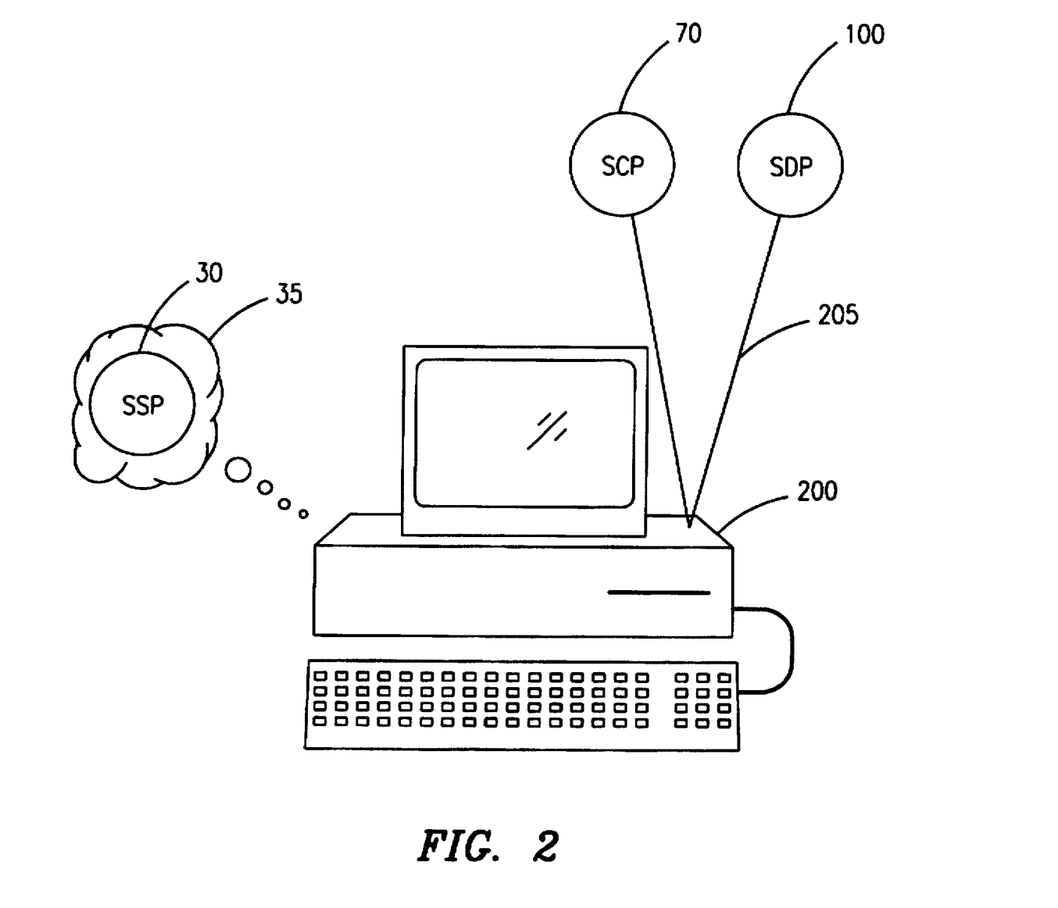
FIG. 2 is a block diagram of a test system illustrating a simulator connecting to a Service Control Point or Service Data Point (SCP/SDP)

In accordance with the Kite application, FIG. 2 is a block diagram of a test system illustrating a simulator 200 substituting for a node in the IN system and connecting to an SCP 70 or SDP 100. In order to test new software modules for the SCP 70 or SDP 100, there is no need to provide a real SSP 30 as long as the simulator can generate and transmit the necessary TCAP messages to effectuate the internal execution of the new software modules. Such a TCAP generator can read off TCAP messages from a test script file and transmit the messages over a communication link. As disclosed in the Kite application, most workstations or personal computers with minimum processing power can accommodate such requirements. Therefore, the simulator 200 replaces the SSP 30 as schematically shown by the bubble 35. The simulator 200, SCP 70, and SDP 100 are interconnected via a more commonly available Local Area Network (LAN) 205 to exchange TCAP messages.

Figure 3:
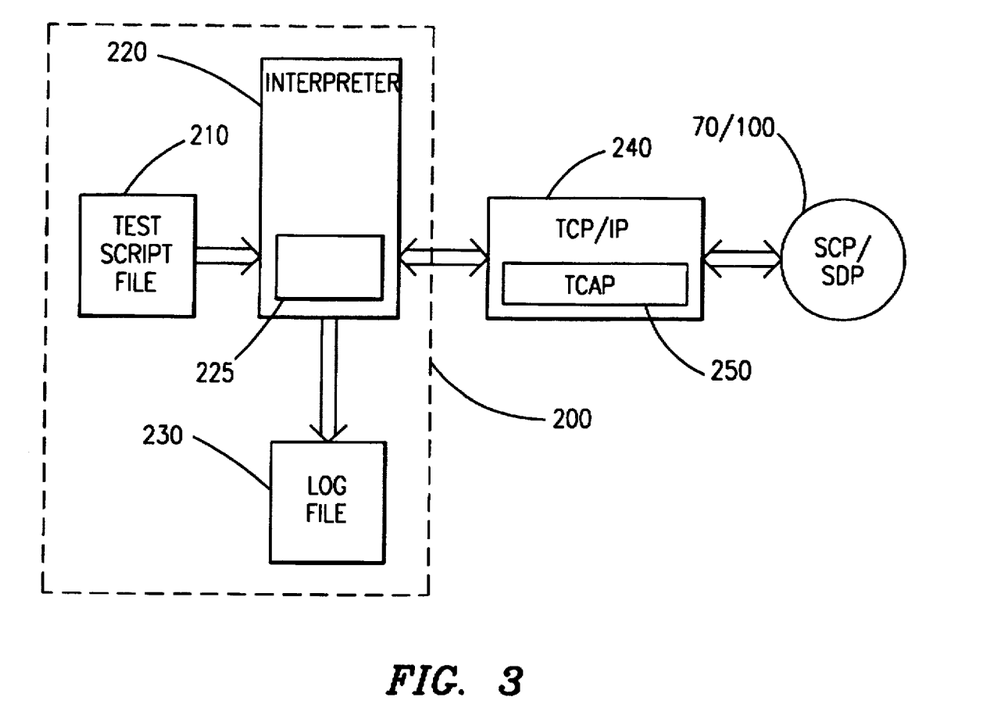
FIG. 3 is a block diagram illustrating the transmission of TCAP messages between a simulator and a SCP/SDP via a Local Area Network (LAN)

FIG. 3 is a block diagram illustrating the transmission of encapsulated TCAP messages between the simulator (workstation) 200 and the SCP 70 or SDP 100. The interpreter module 220 within the simulator 200 reads test messages from the test script file 210 and accordingly generates the appropriate TCAP messages. As mentioned previously, the SCP 70 communicates with other nodes in the IN telecommunications system using TCAP messages. However, even though LANs can support a number of different communication protocols, SS7 TCAP messages are not supported. Therefore, in order to test new software modules via a LAN without altering the communication protocol used by the new software, an interface system is needed between the Transmission Control Point/Internet Protocol (TCP/IP) protocol used for transmission over the network and the TCAP protocol used by the SCP/SDP. Therefore, the interface between TCAP messages and TCP/IP packets is achieved by encapsulating the TCAP messages 250 into the TCP/IP packets 240.

Even though encapsulating the TCAP messages 250 into the TCP/IP packets 240 resolves the communication problem over a LAN, it still does not alleviate the tedious process of encoding a stream of values into the TCAP data format for test purposes. Each TCAP message is a stream of data bytes, and miscoding of even a single bit within any one of the transmitted bytes will cause the test system to behave in an unexpected way. Therefore, in order to accurately perform a function test using a specific test case scenario, each transmitted TCAP message between the simulator 200 and the software modules needs to be perfectly formatted according to the TCAP formats and syntax. Unfortunately, manually ensuring that each TCAP message meets the above requirements is extremely tedious, time consuming, and unreliable.

Figure 4:
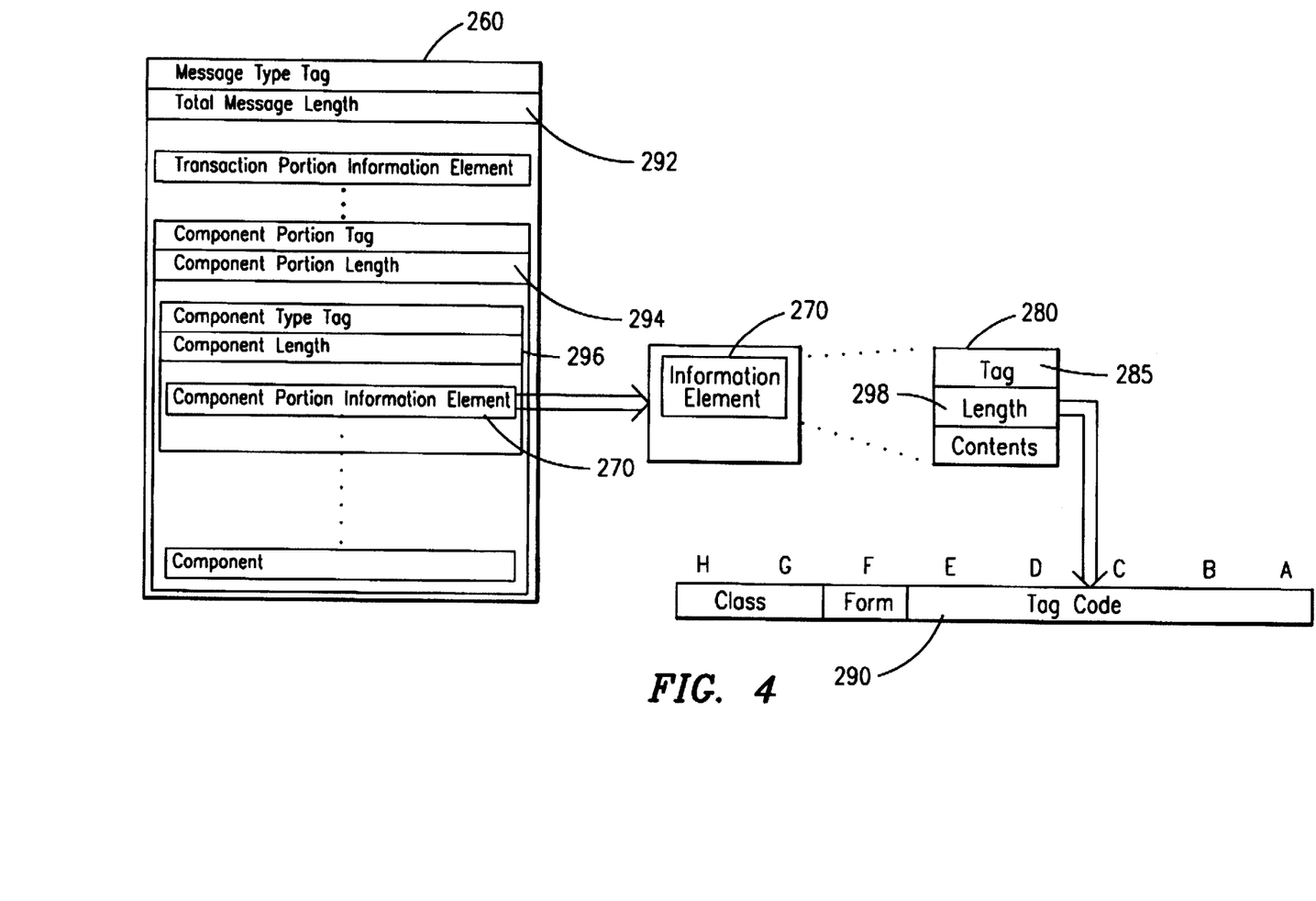
FIG. 4 illustrates the data structure for a TCAP message.

FIG. 4 illustrates the data format required by the TCAP protocol to communicate properly with SS7 based software modules. Each TCAP message 260 has the message type enclosing a number of component types, each component type further enclosing a number of information elements. Each information element 270 is further subdivided into tag, length and contents as illustrated by the data structure 280. Lastly, the tag portion 285 is further subdivided into class, form and tag code as illustrated by the data structure 290. As a TCAP message is being constructed, the total message length 292, the component portion length 294, the component length 296, and the element length 298 each has to be appropriately updated in order to correctly reflect the total length of the message and its individual parts. Moreover, each TCAP message, TAG value, class and form values must be in correct syntax and order. Accordingly, it is a tedious and time-consuming task to manually encode a stream of bytes correctly into the above required format and syntax.

In accordance with the teachings of the present invention, the above problems of encoding and decoding are alleviated by introducing a natural test language with simple keywords. Using such simple keywords, less error prone test cases can be developed much more efficiently and accurately. A test message statement is developed using the above simple keywords. A series of such statements are organized into a test file and later interpreted by an interpreter in real time to generate correctly formatted TCAP messages. The interpreter, based on keywords and specified parameter values within each test statement, automatically encodes, decodes, and verifies TCAP messages and their components.

Figure 5:
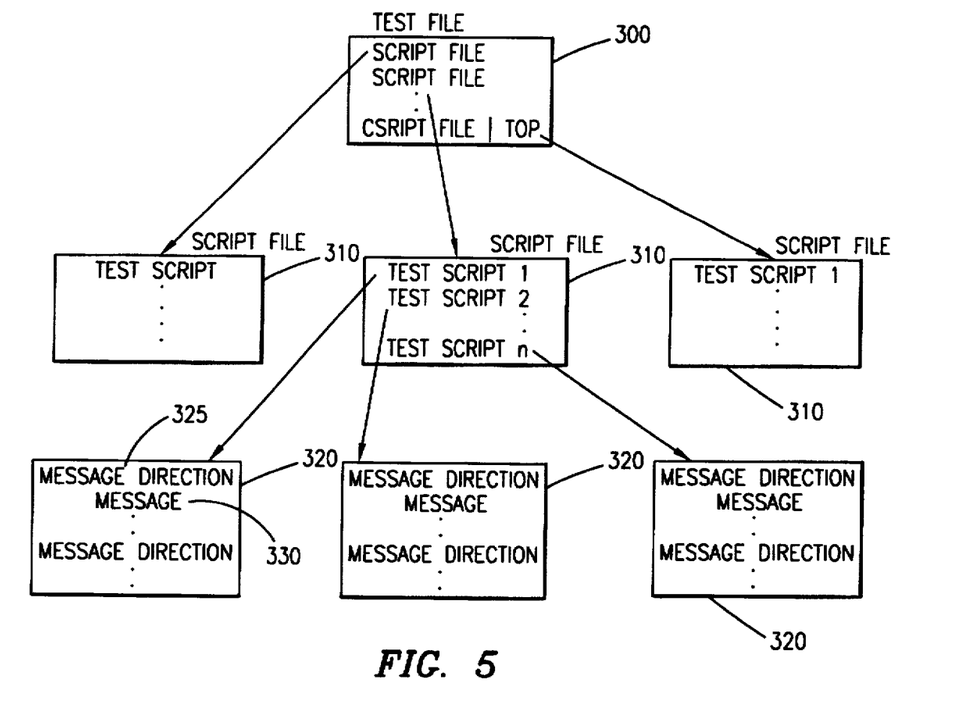
FIG. 5 illustrates the hierarchical layout of a test script file in accordance with the teachings of the present invention.

Accordingly, FIG. 5 illustrates the hierarchical layout of a test script file 310 in accordance with the teachings of the present invention. The test file 300 contains references to a number of different test script files 310. When a test personnel specifies a test file, the interpreter starts retrieving the test script file references consecutively from the top and interprets them until the end of the file 300 is reached. Each test script file 310, in turn, can contain a number of test scripts 320. Finally, each one of those test scripts 320 can comprise of a number of message direction labels 325, each message direction label being followed by one or more test messages 330. The interpreter reads the test messages 330 and automatically generates correctly formatted TCAP messages in accordance with the keywords and parameters specified in the test messages 330 if the interpreting message direction label 335 indicates an outgoing message. On the other hand, if the interpreting message direction label 335 indicates an incoming message, the interpreter, using the comparator 225 as shown in FIG. 3, verifies the specified test message along with its keywords and parameters with the received TCAP messages.

Figure 6:
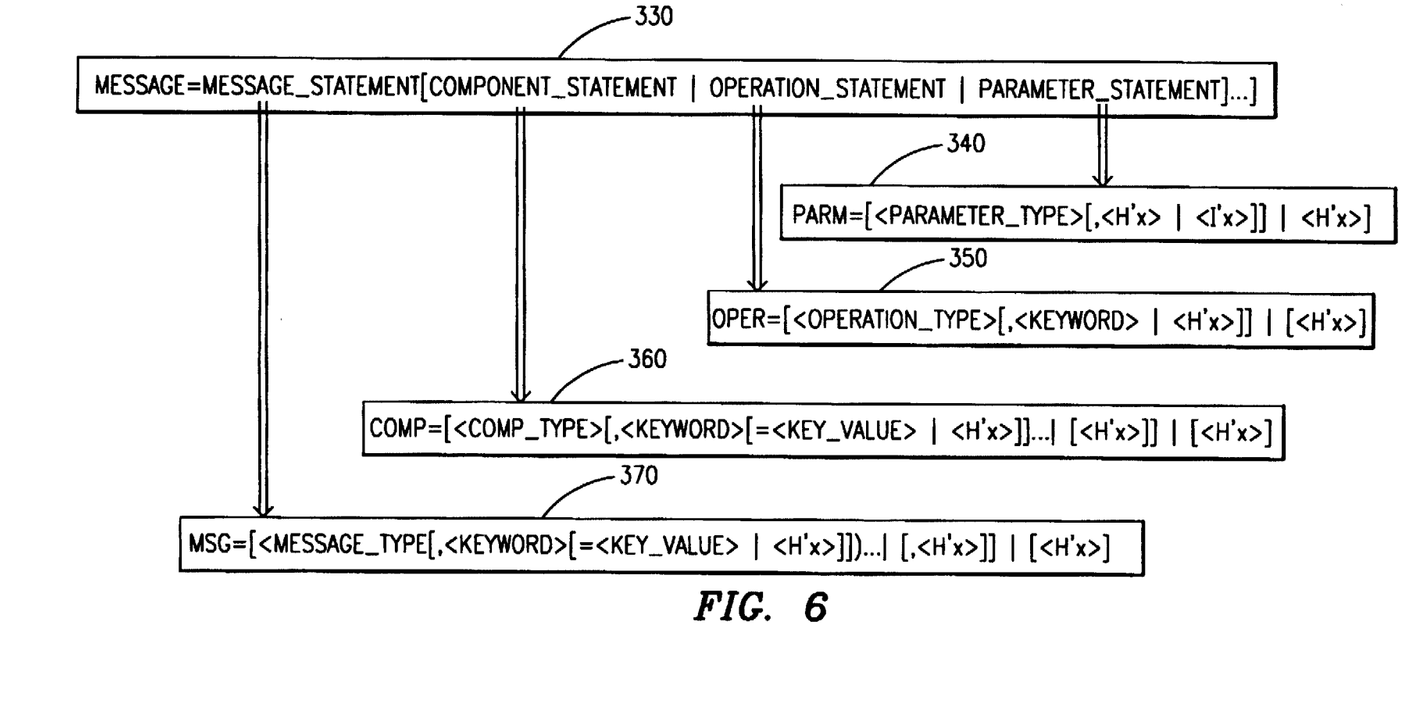
FIG. 6 illustrates the hierarchical layout of a test message in accordance with the teachings of the present invention.

FIG. 6 illustrates the hierarchical layout of a test message in a TCAP scripting Language (TSL) in accordance with the teachings of the present invention. Each test message 330 in a test script file 320 is further subdivided into four different sub-parts including the message statement 370, component statement 360, operation statement 350, and parameter statement 340. Furthermore, each message statement 370 may include one or more component statements 360, operation statements 350 and/or parameter statements 340.

Reference is now made to Table 1. In order to better illustrate the formats of the statements of FIG. 6, the following notations are used:

TABLE 1

Notation Table

| Notation | Explanation |
|---|---|
| Capital Letter | Capital letters represent literal values and require no further interpretation by the interpreter. |
| [ ] | indicates an option to the user. The user has the option of supplying the data specified within the brackets. |
| < > | indicates data needed to be supplied by the user. |
| H'x | indicates a number in hexadecimal format where X is two or more digits (0–9) or letters (A–F) in multiples of two. |
| I'x | indicates a number in ISUP format where x is two or more digits (0–9) in multiples of two. |
| \| | indicates an alternative (or). The user can choose any one of the options enumerated by the \| notation. |
| ... | indicates that the previously specified syntax formation may be repeated for the rest of the statement. |

Blank spaces, e.g., tabs, space, new lines, and form feeds are not significant and are ignored by the interpreter. Accordingly, "COMP=INVOKE" has the same result as "COMP=INVOKE." Furthermore, the length of hexadecimal and ISUP number is an even number.

Therefore, H'2 is not acceptable and needs to be formatted as H'02 to make the length of the data an even number.

The user of TSL can specify the parameter data in many different forms (i.e., decimal, hexadecimal, ASCII strings and numbers in ISUP format). The TSL further supports a number of different communication protocols including CCITT TCAP, and American National Standards Institute (ANSI) TCAP.

Accordingly, utilizing the above notations, a test script file is created according to the following format:

```
test script = message_direction
              message 1
              message 2
              message 3
              .
              .
              .
              message_direction
              message 1
```

The message direction label may be either "<<" or ">>". The label ">>" indicates an outgoing message from the interpreter to the platform supporting new software modules, and the message needs to be constructed according to the rest of the specified message data following the direction label. On the other hand, the label "<<" indicates an incoming message from the platform supporting new software module to the interpreter, and the received message needs to be verified according to the rest of the specified message data following the direction label. Detailed description of the message direction labels is discussed later.

Figure 7:
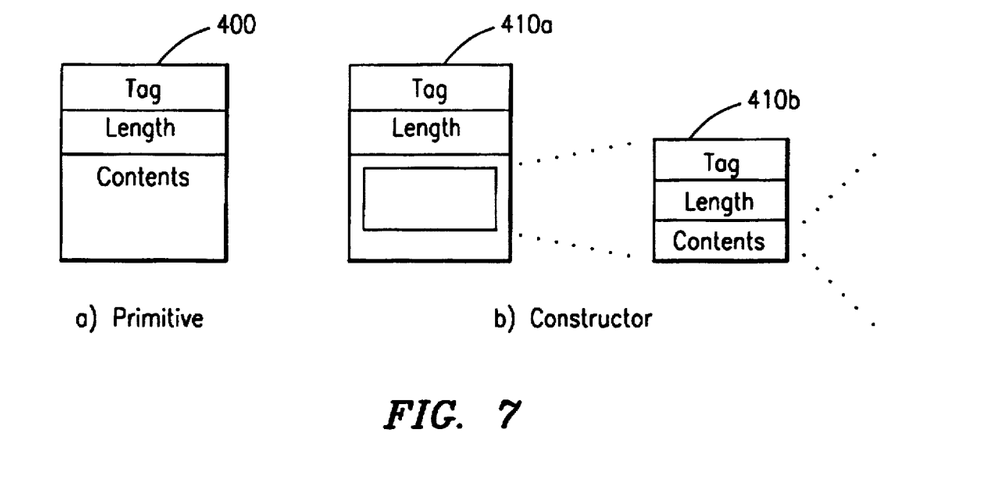
FIG. 7 illustrates the data structures for parameter types.

Each test message 330, as illustrated by FIG. 7, has the following syntax:

---

(Syntax 1)
message = message_statement [ component_statement |
           operation_statement | parameter_statement] ...]

---

In accordance with Table 1, a test message is constructed by first specifying a message statement. After a message statement is specified, a user has the option of specifying a component statement, an operation statement or a parameter statement as depicted by the | notation placed between each of the above three statements shown on Syntax 1. The user further has the option of not specifying anything at all as depicted by the option block "[ ]" enclosing the component statement, operation statement and parameter statement as further shown on Syntax 1. If the user chooses to specify one of the above three statements, as depicted by the ... notation at the end of the message, the user may repeatedly specify additional statements as needed to complete the message. Therefore, the user may construct:

---

MESSAGE = MESSAGE_STATEMENT
          COMPONENT_STATEMENT
          COMPONENT_STATEMENT
          OPERATION_STATEMENT
          PARAMETER_STATEMENT.

---

Each of the above four types of statements has its own syntax and label. The syntax for each of the above statements is discussed in detail individually below.

MESSAGE STATEMENT

The message statement is indicated by the "MSG" label and has the following syntax:

---

(Syntax 2)
MSG = [< message_type> [,<keyword> [=key_value> |
       <H'x> ]] ... | [,<H'x>]] | [H'x>]

---

Again, following the interpretation provided by Table 1, in constructing a message statement (MSG), a user has the option of supplying one of the predefined message types or an equivalent hexadecimal value directly. The message types are predefined by the interpreter using user friendly (i.e., natural language) terminologies and are later converted by the interpreter to the appropriate numerical values during run-time. Such values are concatenated with other user specified data and transmitted over a communication link. If the user chooses to supply a message type, the user further has the option of supplying one of the predefined keywords or an equivalent hexadecimal value. If the user chooses to supply a keyword, the user again has the option of supplying one of the predefined key values or an equivalent hexadecimal value. Accordingly, the user always has the option of ignoring the predefined values supported by the interpreter and manually encoding the numerical values representing the desired TCAP message. Furthermore, if the user chooses to construct a test message using predefined message types and keywords for part of a test message and perform manual encoding for the rest of the message, that is also supported by the interpreter. As a result, the interpreter enables the user the fullest flexibility in constructing desired TCAP messages.

Message types and keywords are predefined labels supported by the interpreter and are created for user's convenience. The predefined types and keywords are (for exemplary purposes, the CCITT TCAP syntax and the ANSI TCAP syntax are both illustrated):

CCITT TCAP Syntax for Message Statement

A message_type represents a TCAP message name and includes BEGIN, CONTINUE, END, U_ABORT, and P_ABORT.

A keyword represents a data label within a TCAP message and includes ORIG_TRAN_ID, DEST_TRAN_ID, U_ABORT_CLAUSE, P_ABORT_CAUSE, and COMPONENT_PORTION. After specifying a keyword, the user may assign a specific key value to be associated with the specified keyword. The assignment can be made with the "=" sign. Accordingly, MSG=BEGIN, ORIG_TRAN_ID=1 is an illustration of assigning numerical value 1 to the ORIG_TRAN_ID keyword. Accordingly, each of the actual data specified by the above keywords has the following data type: ORIG_TRAN_ID is an integer data type; DEST_TRAN_ID is an integer data type; U_ABORT_CAUSE is an integer data type; P_ABORT_CAUSE is an integer data type; and COMPONENT_PORTION keyword has no value and is transmitted by itself. Examples of valid message statements in accordance with the teachings of the present invention are:

(1) MSG=BEGIN (2) MSG=H'62054801026C00

(3) MSG=BEGIN, H'4801026C00

(4) MSG=BEGIN, ORIG_TRAN_ID=1

Comparing lines 2 and 3, a user has the option of manually encoding the full TCAP message as shown by a stream of hexadecimal values on line 2. This would be the conventional way of constructing a TCAP message. On the other hand, the user can specify the message type as "BEGIN" by using one of the predefined types as shown on line 3. The interpreter later changes the specified keyword BEGIN to the appropriate hexadecimal values (h'6205) during run-time and effectively transmits the same encoded message as the message shown on line 2. More conveniently, a user can further utilize the predefined keyword ORIG_TRAN_ID to construct a less error prone and more easily understood message as shown on line 4.

As shown using the above examples, a user constructs a test message much more efficiently and reliably by using interpreter supported TSL words as shown on line 4 rather than manually encoding a stream of bytes as shown on line 2.

ANSI TCAP Syntax for Message Statement

For the ANSI TCAP syntaxed message types, they include QUERY_W_PERM, QUERY_WO_PERM, CONV_W_PERM, CONV_WO_PERM, RESPONSE, U_ABORT, and P_ABORT.

The keywords for the TCAP syntax are ORIG_TRAN_ID, RESP_TRAN_ID, U_ABORT_CAUSE, P_ABORT_CAUSE, and COMPONENT_PORTION. Similar to the CCITT TCAP syntax, the data specified by the above keywords have the following data types: ORIG_TRAN_ID is an integer data type; RESP_TRAN_ID is an integer data type; U_ABORT_CAUSE is a string data type; P_ABORT_CAUSE is an integer data type; and COMPONENT_PORTION has no value and is transmitted by itself.

Examples of ANSI TCAP syntaxed based message statements are:

```
MSG = QUERY_W_PERM
MSG= QUERY_W_PERM,
      H'C70400000001E81BE919CF0101D1020010F21081020
      00182010DA30781001234567809
MSG = QUERY_W_PERM, ORIG_TRAN_ID = 2
MSG = QUERY_W_PERM, ORIG_TRAN_ID =1,
      RESP_TRAN_ID=H'02
MSG = U_ABORT, U_ABORT_CAUSE (bad structure)
```

Again, the TSL interpreter supports a combination of TSL words along with hexadecimal values within a single test message to enable a user the fullest flexibility.

The last MSG statement is not a valid message statement because the specified key word U_ABORT_CAUSE did not specify a predefined key value or an equivalent hexadecimal value as required by the MSG syntax described above.

Among the above keywords, a special handling is needed for the ORIG_TRAN_ID and RESP_TRAN_ID keywords. When an integer value is specified for either of the keywords, the value is preceded with zeros, if necessary, to make the length of the value four bytes. Furthermore, when the ORIG_TRAN_ID keyword is immediately followed by the RESP_TRAN_ID keyword, and both values are specified as integers, then the keywords are encoded as one parameter instead of two.

COMPONENT STATEMENT

A message statement within a test message may be followed by a component (COMP) statement. The component statement is the data part of a TCAP message and may be more than one for a single test message. The component statement, in accordance with the teachings of the present invention, has the following syntax:

```
COMP = [< comp_type > [,< keyword > [= <key_value>
        |< H'x>]] ... | [,<H'x>]] | [<H'x>]
```

Accordingly, in constructing a component statement, a user has the option of supplying one of the predefined component types (comp_type) or an equivalent hexadecimal value directly. If the user chooses to supply a component_type, the user further has the option of supplying one of the predefined keywords or an equivalent hexadecimal value. If the user chooses to supply a keyword, the user again has the option of supplying one of the predefined key values (key_value) or an equivalent hexadecimal value. As indicated during the description of the MSG statement, a user has the option of utilizing the predefined component types and key words supported by the interpreter or manually encoding the equivalent values directly. Again, the user may use predefined types for some parts of the message statement and manually encode the rest.

The component types and keywords are:

CCITT TCAP Syntax for Component Statement

A comp_type represents the type of data within a TCAP message and includes INVOKE, RETURN_RESULT_l, RETURN_RESULT_nl, RETURN_ERROR, and REJECT.

A keyword represents a data label and includes INVOKE_ID, LINKED_ID, ERROR_CODE, PROBLEM_CODE, and SEQ. The actual data specified by the above keywords have the following data types: INVOKE_ID is an integer data type; LINKED_ID is an integer data type; ERROR_CODE is an integer data type; PROBLEM_CODE is an integer data type; and SEQ has no value and is transmitted by itself.

11

Examples of valid component statements in accordance with the teachings of the present invention are:
  COMP=INVOKE
  COMP=INVOKE, INVOKE_ID=1
  COMP=INVOKE, INVOKE_ID=H'01
  COMP=RETURN_RESULT_L, INVOKE_ID=1, SEQ ANSI TCAP Syntax for Component Statement For the ANSI TCAP syntaxed comp_types, they are INVOKE_1, INVOKE_nl, RETURN_RESULT_1, RETURN_RESULT_NL, RETURN_ERROR, and REJECT.

The keywords for the ANSI TCAP syntax are INVOKE_ID, CORRELATION_ID, ERROR_CODE, PROBLEM_CODE, and SEQ. Similar to the CCITT TCAP syntax, the data specified by the above keywords have the following data types: INVOKE_ID is an integer data type; CORRELATION_ID is an integer data type; ERROR-CODE is an integer data type; PROBLEM_CODE is an integer data type; and SEQ has no value and is transmitted by itself.

Once again, among the above key words, a special handling is needed for the INVOKE_ID and CORRELATION_ID keywords. When the INVOKE_ID keyword is immediately followed by the CORRELATION_ID keyword and both values are specified as integer data types, then the keywords are encoded as one parameter instead of two.

Examples of valid message statements in the ANSI TCAP syntax in accordance with the teachings of the present inventions are:
  COMP=INVOKE_L
  COMP=INVOKE_L, INVOKE_ID=1
  COMP=INVOKE_L, INVOKE_ID=H'01
  COMP=RETURN_RESULT_L, CORRELATION_ID=1, SEQ

OPERATION STATEMENT

A message statement or component statement may be followed by an operation statement (OPER) with the following syntax:

OPER = [< operation_type> [,<keyword> | <H'x>]] |
    [<H'x >]

Accordingly, in constructing an operation statement (OPER), a user has the option of supplying one of the predefined operation types or an equivalent hexadecimal value directly. If the user chooses to supply an operation statement, the user again has the option of supplying one of the predefined key values or an equivalent hexadecimal value. This syntax is once again consistent with the teachings of the present invention which enables a user the greatest flexibility in constructing a test message.

Each operation type (or tag) has a set of equivalent TCAP values known as the tag code and the class value. Therefore, instead of tediously encoding the necessary numerical values for a tag code and a class value, Table 2 below illustrates the operation type (or tag) and its TCAP equivalent tag code and class values. Whenever a user specifies an operation type, its equivalent tag code and class value are retrieved by the interpreter to automatically construct the necessary TCAP formatted message. For example, if a user constructs OPER=CREATE, the interpreter, during runtime, retrieves the associated tag code 4 and class value 2 and transmits the retrieved values in place of the CREATE operation statement.

12

Accordingly, Table 2 below illustrates the tag code, class and parameter values for each of the operation types.

TABLE 2

Operation Tags and Parameters

| TAG (1) | TAG CODE (2) | CLASS (3) | DEFAULT PARAMETERS AND ITS TAG VALUE (4) |
|---|---|---|---|
| ACTRES | 1 | 2 | OPID 1, RELEASE 5, RESULT 6, MORE 8 |
| CHARINFO | 9 | 2 | OPID 1, LEGID 2, RESULT 3, HOLDEXEC 4, MORE 5, CHARCHG 6, CHARFREE 7, CHARNR1 8, CHARNR2 9, CHARDET 10, UNITADD 11, UNITLIM 12, CHARREC 13 |
| CONGCTR | 3 | 2 | OPID 1, CCORGIN 2, VERSION 11 |
| CREATE | 4 | 2 | OPID 1, CNR 2, LEGIDCR 3, BO 5, CALLINGCAT 6, RESULT 7, HOLDEXEC 8, MORE 9, VERSION 13 |
| EVENT | 5 | 2 | OPRETID 1 |
| FREE | 6 | 2 | OPID 1, LEGMASK 2, RESULT 3, MORE 5 |
| GENERATE | 7 | 2 | OPID 1 |
| HANDOVER | 8 | 2 | OPID 1, HOCOUNT 2, ADINFSND 3, ADINFREC 4, HONR 5, HODATA 6, APPLID 7, SERVKEY 10, TRIGGER 11, CCIND 12, BNR 13, ANR 14, ACAT 15, AREA 16, ROUTEORG 17, REDIRINF 18, REDIRNR 19, RPRIVENR 20, ANRPRIVE 21, ORNETID 22, VERSION 23 |
| JOIN | 10 | 2 | OPID 1, RESULT 5, MORE 7 |
| MONITOR | 11 | 2 | OPID 1, MORE 3 |
| OPEN | 12 | 4 | OPID 1 |
| PI | 13 | 2 | OPID 1, APPLID 2, SERVKEY 5, TRIGGER 6, CCIND 7, BNR 8, ANR 9, ACAT 10, AREA 11, ROUTEORG 12, REDIRINF 13, REDIRNR 14, RPRIVENR 15, ANRPRIVE 16, ORNETID 17, VERSION 18 |
| RELRES | 14 | 2 | OPID 1 |
| RESTIMER | 15 | 4 | OPID 1 |
| RETRIEVE | 16 | 1 | OPID 1, APPLID 2, DATAID 3, VERSION 4 |
| SPLIT | 18 | 2 | OPID 1, RESULT 3, MORE 5 |
| TRANSCTR | 20 | 4 | OPID 1 |
| UPDATE | 21 | 1 | OPID 1, APPLID 2, DATAID 3, DATAINFO 4, MORE 5, VERSION 6 |
| RRRETR | 16 | 1 | OPRETID 1, DATAINFO 2 |
| RRUPDATE | 21 | 1 | OPRETID 1 |

Each operation type further has all of its parameters listed on column 4 of Table 2. Each parameter listed in column 4 for each operation type further has a numerical value representing the equivalent tag code value for that parameter. The test personnel can change this or add optional parameters when needed.

Examples of operation statements in accordance with the teachings of the present invention are:

OPER = CREATE
  OPER = RETRIEVE, SET
  OPER = RETRIEVE,
    H'31108102000182010DA30781001234567809

PARAMETER STATEMENT

Lastly, a message statement may be followed by a parameter (PARM) statement. Using a PARM statement, a user sends data such as calling party numbers or other types of information (data). The PARM statement has the following syntax:

PARM = [ <parameter_type> [,<H'x> | <I'x>]] |
           [<H'x>]

In accordance with the teachings of the present invention, a user, while constructing a parameter statement, has the option of supplying one of the predefined parameter type or an equivalent hexadecimal value. If the user chooses to utilize one of the predefined parameter types, the user again has the option of supplying a value. The value can be specified in a hexadecimal value or can be an ISUP formatted value. If the user chooses not to specify a value after the parameter type, a default value is retrieved from Table 3 and automatically encoded by the interpreter during run-time. The parameter type itself is also converted according to the value stored in column 4 of Table 2 during run time as explained previously. The reason parameters are repeated for each operation type in Table 2 is because of the fact that the same parameter for one operation type might need to be encoded with a different value than for another operation type. For example, the Trigger parameter for the Handover operation type is later encoded with the value of 11. The same Trigger parameter for the PI operation type is encoded with the different value of 6 as shown in Table 2.

Accordingly, Table 3 illustrates the parameter types and the default value for each parameter type. The default parameter values are initially unassigned, and the user can assign any value as the default value. The user can further add or change default parameter values in the parameter default table as needed.

TABLE 3

Parameter Default Table

| TAG | FORM | DEFAULT PARAMETER VALUE |
|---|---|---|
| ADINFSND | P | |
| ADINFREC | P | |
| APPLID | P | |
| BNR | P | |
| AREA | P | |
| ACAT | P | |
| ANR | P | |
| ANRPRIVE | P | |
| CHARNR1 | P | |
| CHARNR2 | P | |
| CCIND | P | |
| CCORIGIN | P | |
| CHARDET | P | |
| CHARFREE | P | |
| CHARCHG | P | |
| CHARREC | P | |
| DATAID | C | |
| DATAINFO | C | |
| CNR | P | |
| HOCOUNT | P | |
| HODATA | P | |
| HONR | P | |
| HOLDEXEC | P | |
| LEGID | P | |
| LEGIDCR | P | |
| MORE | P | |
| OPID | P | |
| OPRETID | P | |
| ORGNETID | P | |
| ORGNRANAL | P | |
| VERSION | P | |
| REDIRNR | P | |
| RPTVENR | P | |

TABLE 3-continued

Parameter Default Table

| TAG | FORM | DEFAULT PARAMETER VALUE |
|---|---|---|
| REDIRINF | P | |
| RELEASE | P | |
| RELMASK | P | |
| RESULT | P | |
| ROUTEORG | P | |
| SERVKEY | P | |
| BANSTIMER | P | |
| UNITADD | P | |
| UNITLIM | P | |
| TRIGGER | P | |

A parameter type can be primitive (P) or constructed (C) as indicated by the tag form column in Table 3. A primitive parameter's contents contain a single group of data. On the other hand, a constructed parameter's contents may further contain one or more parameters data. Accordingly, FIG. 7 illustrates the data structures representing the primitive and constructor parameters. The primitive parameter type's contents contain a single group of data as depicted by the data structure 400. However, the constructor parameter type's contents may contain additional nested parameters as depicted by the data structures 410a and 410b. A second parameter information is embedded within a first parameter's contents. Likewise, additional parameters may be nested into the second parameter.

When a parameter type is specified, the default value table (Table 3) is used to determine the tag form of a parameter. If a user wants to specify a constructed parameter, it should be expressed as a hexadecimal string. On the other hand, the contents of primitive parameters can be specified as a hexadecimal string, i.e. H'x, or as an ISUP number, i.e., I'x. When the ISUP specification is used, the specified digits are encoded in the ISUP format. The following two examples illustrates the format of an ISUP number for the parameter Calling PartyNumber. If the number is 2147836846, the parameter are specified as:

PARM=ANR, I'2147836846 or
    PARM=ANR, H'1274388664

The parameter type ANR is a primitive parameter as shown in Table 3. Accordingly, it only contains a single group of data, the calling party's telephone number, and can be specified in the hexadecimal format or the ISUP format. However, if a user specifies the data in the hexadecimal format, the digits must be swapped in each byte as per the encoding rules for an ISUP number. Accordingly, the calling party number 21 47 83 68 46 is reverted within each byte resulting in 12 74 38 86 64. On the other hand, by using the I'x form, the user can specify the digits in their normal order and the driver automatically reverts the number according to the ISUP rules. Additionally, two bytes will be added in front of the ISUP digits when the parameter contents are encoded. Accordingly, the contents of the two bytes are hard coded to: H'0100 for an even number of digits; and H'8100 for an odd number of digits. When no parameter values are specified, default values are retrieved from Table 3 by the interpreter to generate the necessary TCAP message.

The following is an example of how a constructed parameter containing nested parameters can be set up:

OPER=UPDATE
    PARM=DATAID, H'C10401020304C2020102

The UPDATE operation_type is later converted to tag value 21 and class 1 as shown in Table 2. The DATAID parameter has the value of 3 as further shown in table 2. DATAID is the tag for the DataItemIdentifier parameter which is defined as a constructed parameter as further illustrated in Table 3. Since it is a constructed parameter, it can be a nested type of parameter and may contain more than one parameter. Accordingly, C1 is the first internal tag code, 04 (four bytes) is the length of the contents of the first tab, and 01020304 is the contents of the first tag. C2 is the second internal tag code, 02 (two bytes) is the length of the contents of the second tag, and 0102 is the contents of the second tag. The constructed parameter DataItemIdentifier can also be specified as:

PARM=H'A30AC10401020304C2020102, where A3 is the DATAID tag code and 0A is the length of the contents of DATAID.

Examples of parameter statements in accordance with the teachings of the present invention are:

PARM=OPID, h'0A34
PARM=APPLID, H'00
PARM=DATAID, H'01020A11
PARM=H'2304030124B5
MESSAGE DIRECTION

The >> label represents the generation and transmission of TCAP messages from the TCAP interpreter to the platform supporting new software modules. The TCAP messages are generated according to the specified statements, keywords and values following the >> label. The TCAP driver automatically updates the total length field of the previously constructed parameters as subsequent parameters are added to the message. However, in order to update the length fields, without having the TCAP interpreter calculate the length of the newly added data itself, the TCAP driver must be "told" of the length. Therefore, the TCAP driver is told of the length when a specific statement or keyword is used in a message by referencing Table 4:

TABLE 4

Updated Length Fields

| Length Field | Statement/Keyword |
|---|---|
| total message length | MSG |
| component portion length | COMPONENT_PORTION |
| component length | COMP |
| sequence length | SEQ |
| set length | SET |

On the other hand, the << label represents an incoming TCAP message received by the interpreter from the platform supporting the new software modules. The interpreter waits until a message is received over a communication link and compares the received TCAP message against the specified statements, keywords, and values following the << label. In general, the specified data must Match exactly the message received from the new software module. However, during function testing, it is often necessary to only check for the existence while disregarding the actual value of some data. It is further desirable to verify only some part of the data and ignore the rest. Therefore, in accordance with the teachings of the present invention, a user may instruct the driver to verify only one or more parameter values from a received message and to ignore any part of a parameter value by using the ignore symbol "?". The ignore symbol "?" indicates that data or part of data should exist for a specified parameter within a received TCAP message, but the value itself is not significant (i.e., the value should be ignored). When the ignore symbol is used within a hexadecimal string, the smallest value that can be ignored is one byte or octet. Since each "?" sign represents 4 bits (8 bits comprise a byte), the ignore symbol must be specified in pairs, i.e. ?? in a hexadecimal string to properly represent a byte. However, the ignore symbol cannot be used in an ISUP string.

Examples of parameter statements with the ignore symbol are:

```
<<
(1) MSG = CONTINUE, ORIG_TRAN_ID = 2,
    PROV_DIALOG_ID=?
(2) COMP = RETURN_RESULT, SEQ, INVOKE_ID=h'??
(3) OPER = CREATE
(4) PARM = OPID, H'01??
(5) PARM = CNR, H'0210??00
```

Accordingly, in the above received MSG statement (line 1), the provider dialog ID (PROV_DIALOG_ID) data must exist in the received TCAP message, but the value itself is not significant. Similarly, in the above COMP statement (line 2), only the presence of an invoke ID parameter is verified, and the invoke ID tag, length field, and invoke ID values are ignored. Furthermore, the ignored symbol can be used in the middle of a data stream to verify only part of data and to ignore the rest. For example, in the above PARM statement (line 4), the first byte of the operation ID data is verified to be equal to H'01 and only the existence of the second byte of the data is verified. For further illustration, in the second PARM statement (line 5) above, the first byte of the destination number data is verified to be equal to H'02, the second byte (length) is verified to be equal to H'10, the third byte is ignored as indicated by the ignored symbols and the fourth byte is verified to be equal to H'00.

Accordingly, the TCAP driver uses the following rules to determine the next verification starting position when an ignore symbol is used in a message specification:

a) if the ignore symbol is used in a keyword value, then verification will continue with the next keyword or statement in the message;

b) if the ignore symbol is the only character in a hexadecimal string, i.e. H'??, then verification continues with the next statement or keyword in the message; and c) if the ignore symbol is not the only character in a hexadecimal string, e.g. H'8102??01, then verification continues with the next byte in the message.

Additionally, the driver provides a set of variables which can be used during the construction and verification of messages. Variables are used to store values from messages and to compare against values in messages. Such variables are desirable because a value previously transmitted can be stored in a variable and later used to verify a value stored in an incoming TCAP message. Also, a value from an incoming message which needs to be returned back to the sender can be stored in a variable and later loaded onto a subsequently transmitted message.

There are two types of variables according to the teachings of the present invention: keyword variable, and byte variable. Keyword variables are defined as "$n", where n is a number from 1 to 9. Byte variables are defined as "%n", where n is a number from 1 to 9. Keyword variables store up to 255 bytes of data. However, keyword variables can only be used in the place of keyword values. On the other hand, a byte variable stores one byte of data and can only be used with hexadecimal strings.

Whether a value is to be stored in a variable or retrieved from a variable is determined by the direction of the message being interpreted. A value from a message is stored in a variable when a variable used during a reception of an incoming TCAP message. A value is retrieved from a variable and attached to a constructed message when the driver transmits a TCAP message.

The following examples illustrate a byte variable storing the originating transaction ID from a received BEGIN message and using that value as the destination transaction ID in a subsequently transmitted CONTINUE message as further illustrated by the underline portion of the messages:

```
<<
    MSG = H'62054801%16C...
>>
    MSG = CONTINUE,H'4801004901%16C...
```

The fifth byte of the incoming message is stored in the %1 byte variable and is used to transmit back to the platform while subsequently sending the CONTINUE message by placing it on the sixth byte.

The following examples further illustrates a keyword variable storing the originating transaction id from a received BEGIN message and using that value as the destination transaction id in a subsequently transmitted CONTINUE message:

```
<<
    MSG = BEGIN, ORIG_TRAN_ID = $2
>>
    MSG = END, ORIG_TRAN_ID=$2
```

In this way, a user does not have to worry about the content of the data and uses a variable to ensure that the sender receives the same desired data on the subsequently transmitted message.

The TCAP driver services the connections in a round-robin fashion. Only one message/instruction in the test script is processed before the TCAP driver services the next connection. If the >> label is encountered, the TCAP driver interprets the specified message and sends it over a communication link (e.g., Ethernet) to the platform supporting the new software modules. If the driver detects an error in the test script, an error message is written to the standard output.

If the << label is encountered, the TCAP driver receives a message over the communication link and verifies the message with the specified statements, keywords and values. If the driver detects an error in the message specification or a difference between the message received and what is specified in the test script, the differences are reported via a message to the standard output device (i.e., log file). The error message contains an indication of where the error occurred. The verification of a message terminates when a difference is detected. By reviewing this log file, a test personnel is able to ascertain whether the new software modules have executed properly and the function test has been successful. If there is an error logged, the test personnel can further evaluate which incoming and outgoing message created the error and debug the software modules to determine the exact error.

Once test scripts are constructed by a test personnel, the interpreter automatically produces the necessary TCAP messages and no longer needs the supervision or help of a test personnel. This frees up test personnel resources and further alleviates the problems involved with function testing.

Two complete test script examples are listed in Appendices A and B to illustrate the use of TSL.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

APPENDIX A

```
Example 1
# ********************************************************************
# This test script assumes CCITT TCAP over CCITT SS7.

# This test script sends a BEGIN message with a ProvideInstructions operation to
# the UNIX SCP. A CONTINUE message with a Create, ChargingInformation,
# and TransferControl operation is expected in response.
# ********************************************************************
>>Send a message to the UNIX SCP.
MSG = BEGIN,DEST_TRAN_ID = 1
COMP = INVOKE,INVOKE_ID = 2
OPER = PI
PARM = OPID,H'0100
PARM = APPLID, H'0A
PARM - SERVKEY,T'2147836846
<<Receive a CONTINUE message from the UNIX SCP.
# Ignore the originating transaction id value. The designation transaction id value
# should match the one sent in the BEGIN message.
MSG = CONTINUE,ORIG_TRAN_ID = ?,DEST_TRAN_ID = 1
# Ignore the invoke id value.
COMP = INVOKE,INVOKE_ID = ?
OPER = CREATE
# Ignore the SendingOperationId value of the OperationId. Verify that the
# LastProcessedOperationId value of the OperationId is equal to the
# SendingOperationId value from the BEGIN message.
PARM = OPID,H'??01
# Verify that the DestinationNumber parameter (H'C2) is present and has a
# length of 10 bytes (H'0A). Also verify that number is present, but ignore the
# value.
```

APPENDIX A-continued

```
PARM = H'C20A??
# Ignore the invoke id value.
COMP - INVOKE,INVOKE_ID = ?
OPER = CHARINFO
# Ignore the SendingOperationId value of the OperationId. Verify that the
# LastProcessedOperationId value of the OperationId is equal to the
# SendingOperationId value from the BEGIN message.
PARM = OPID, H'??01
# Verify that the ChargeNumber1 parameter is present, the first and second
# bytes of the number are equal to H'0001, the third byte is ignored and the
# fourth and fifth bytes are equal to H'0241. The remaining bytes are ignored.
PARM = CHARNR1,H'0001??0241??
# Ignore the invoke id value.
COMP = INVOKE,INVOKE_ID = ?
# Verify that the OperationId parameter (H'01) is present and has a
# length of 2 bytes (H'02). Ignore the SendingOperationId value of the OperationI.
# Verify that the LastProcessedOperationId value of the OperationId is equal to
# the SendingOperationId value from the BEGIN message.
OPER = TRANSCTR,H'0102??01
```

APPENDIX B

```
Example 2
# *********************************************************
# This test script assumes ANSI TCAP over TCP/IP.

# This test script receives a QUERY WITH PERMISSION message with a
# Retrieve operation from an AXE SCP.A RESPONSE message with a result
# is expected in response.
# *********************************************************
<<Receive a QUERY WITH PERMISSION message from an AXE SCP.
# Save the originating transaction id in keyword variable $1.
MSG = QUERY_W_PERM,ORIG_TRAN_ID=$1,COMPONENT_PORTION
# Save the invoking id in keyword variable $2.
COMP = INVOKE_L,INVOKE_ID = $2
OPER = RETRIEVE,SET
# Save the SendingOperationId value of the OperationId in byte variable %3.
# Ignore the remaining bytes.
PARM = OPID,H'%3??
# Verify that ApplicationId parameter is equal to 50 (H'32).
PARM = APPLID,H'32
# Ignore the value of the DataItemIdentifier parameter.
PARM = DATAID,H'??
>>Send a RESPONSE message to the AXE SCP.
# Set the responding transaction id value to the value of keyword variable $1.
MSG = RESPONSE,RESP_TRAN_ID = $1 COMPONENT_PORTION
# Set the correlation id value to the value of keyword variable $2.
COMP = RETURN_RESULT_L,CORRELATION_ID = $2,SEQ
# Set the LastProcessedOperationId and InvokingOperationId values of the
# OperationReturnId parameter to the value of byte variable %3.
PARM = OPRETID,H'01%3%3
# The default value is used for parameter DataItemInformation.
PARM = DATAID
```

What is claimed is:

1. A system for generating Transaction Capable Application Protocol (TCAP) messages to test a telecommunications software module comprising:

a test script file containing at least one test message constructed using a natural script language, said natural script language employing a TCAP syntax;

an interpreter for receiving said at least one test message from said test script file, and for converting said natural script language of said received test message into the TCAP message pursuant to said TCAP syntax; and means for transmitting said TCAP message from said interpreter to said telecommunications software module for effectuating the execution and testing of said telecommunications software module.

2. The system of claim 1 further comprising a log file for recording said TCAP message transmitted to said telecommunications software module, and recording a response to said transmitted TCAP message received from said telecommunications software module.

3. The system of claim 2 wherein said interpreter further comprises a comparator for comparing said response with a certain test message stored in said test script file, and generating an error message if said response and said certain test message differ.

4. The system of claim 3 wherein said certain test message includes an ignore directive, and wherein said comparator ignores differences between a part of said response and a part of said certain test message when said part of the certain test message includes the ignore directive.

5. The system of claim 3 wherein said log file records said error message generated by said comparator.

6. The system of claim 1 wherein said test message comprises:

a first statement corresponding to a message portion of the TCAP message;

a second statement corresponding to a component portion of the TCAP message;

a third statement corresponding to a tag portion of the TCAP message; and a fourth statement corresponding to contents of a component portion information element within the TCAP message.

7. The system of claim 6 wherein:

said first statement comprises a message statement identifying a message type of the TCAP message;

said second statement comprises a component statement identifying a component type of the TCAP message;

said third statement comprises an operation statement identifying a tag type of the TCAP message; and said fourth statement comprises a parameter statement representing contents of said component portion information element of the TCAP message.

8. The system of claim 1 wherein said test message further comprises a message direction label for indicating whether the TCAP message is transmitted to or from the telecommunications software module to be tested.

9. A method of constructing a Transaction Capable Application Protocol (TCAP) message, said method comprising the steps of:

generating a test message using a natural script language said natural script language employing a TCAP syntax; and converting the natural script language of said test message into the TCAP message pursuant to said TCAP syntax, said test message comprising a plurality of statements:

a first statement corresponding to a message portion of the TCAP message;

a second statement corresponding to a component portion of the TCAP message;

a third statement corresponding to a tag portion of the TCAP message; and a fourth statement corresponding to contents of a component portion information element within the TCAP message.

10. The method of claim 9 wherein said TCAP message comprises a plurality of parts, and wherein the step of converting further comprises the step of converting any given order of the plurality of statements into a predefined specific order of the plurality of parts for the TCAP message.

11. The method of claim 9 wherein:

said first statement comprises a message statement identifying a message type of the TCAP message;

said second statement comprises a component statement identifying a component type of the TCAP message;

said third statement comprises an operation statement identifying a tag type of the TCAP message; and said fourth statement comprises a parameter statement representing contents of said component portion information element of the TCAP message.

12. The method of claim 9 wherein the TCAP message is used to function test a telecommunications software module, and wherein said test message further comprises a message direction label for indicating whether the TCAP message is transmitted to or from the telecommunications software module to be tested.

13. The method of claim 9 wherein said TCAP message comprises a plurality of parts, and wherein the plurality of statements include both natural language components and TCAP formatted components, and wherein the step of converting further the steps of:

converting only the natural language components in generating the TCAP message; and retaining the TCAP formatted components in generating the TCAP message.

14. The method of claim 9 wherein said TCAP message includes a length portion, and wherein said step of converting further comprises the step of adjusting the length portion to account for the conversions of each of said individual test message statements.

15. The method of claim 9 wherein the TCAP message comprises data labels and data associated with each data label, and wherein the natural script language of the test message includes:

keywords relating to and convertable into the data labels of the TCAP message; and variables relating to and convertable into the data associated with the data labels of the TCAP message.

16. The method of claim 9 wherein the TCAP message comprises data labels and data associated with each data label, and wherein the natural script language of the test message includes:

keywords relating to and convertable into the data labels of the TCAP message; and hexadecimal values comprising the data associated with the data labels of the TCAP message.

17. A method for testing a telecommunications software module using Transaction Capable Application Protocol (TCAP) messages, said method comprising the steps of:

generating a test script file containing at least one test message constructed using a natural script language, said natural script language employing a TCAP syntax;

converting said natural script language of said at least one test message into said TCAP message pursuant to said TCAP syntax; and transmitting said TCAP message to said telecommunications software module for effectuating the execution and testing of said telecommunications software module.

18. The method of claim 17 further comprising the steps of:

recording said TCAP message transmitted to said telecommunications software module; and recording a response to said transmitted TCAP message received from said telecommunications software module.

19. The method of claim 18 further comprising the steps of:

comparing said response with a certain test message stored in said test script file; and generating an error message if said response and said certain test message differ.

20. The method of claim 19 further comprises the step of ignoring differences between a part of said response and a part of said certain test message when said part of the certain test message includes an ignore directive.

21. The method of claim 19 further comprises the step of recording said error message generated during said step of comparison into a log file.

22. The method of claim 17 wherein said test message comprises:

a first statement corresponding to a message portion of the TCAP message;

a second statement corresponding to a component portion of the TCAP message;

a third statement corresponding to a tag portion of the TCAP message; and a fourth statement corresponding to contents of a component portion information element within the TCAP message.

23. The method of claim 22 wherein:

said first statement comprises a message statement identifying a message type of the TCAP message;

said second statement comprises a component statement identifying a component type of the TCAP message;

said third statement comprises an operation statement identifying a tag type of the TCAP message; and said fourth statement comprises a parameter statement representing contents of said component portion information element of the TCAP message.

24. The method of claim 17 wherein said test message further comprises a message direction label for indicating whether the TCAP message is transmitted to or from the telecommunication software module to be tested.

25. The method of claim 17 wherein said test message comprises a plurality of statements and the TCAP message comprises a plurality of parts, and wherein the plurality of statements include both natural language components and TCAP formatted components, and wherein the step of converting further comprises the steps of:

converting only the natural language components in generating the TCAP message; and retaining the TCAP formatted components in generating the TCAP message.

26. The method of claim 17 wherein said test message comprises a plurality of statements, and wherein said TCAP message includes a length portion, and wherein said step of converting further comprises the step of adjusting the length portion to account for the conversions of each of said individual test message statements.

27. The method of claim 17 wherein the TCAP message comprises data labels and data associated with each data label, and wherein the natural script language of the test message includes:

keywords relating to and convertable into the data labels of the TCAP message; and variables relating to and convertable into the data associated with the data labels of the TCAP message.

28. The method of claim 17 wherein the TCAP message comprises data labels and data associated with each data label, and wherein the natural script language of the test message includes:

keywords relating to and convertable into the data labels of the TCAP message; and hexadecimal values comprising the data associated with the data labels of the TCAP message.

* * * * *